United States Patent [19]

Herr et al.

[11] Patent Number: 5,389,467
[45] Date of Patent: Feb. 14, 1995

[54] RECHARGEABLE GALVANIC LITHIUM CELL

[75] Inventors: Rudolf Herr; Hans-Walter Praas, both of Kelkheim, Germany

[73] Assignee: Varta Batterie Aktiengesellschaft, Hanover, Germany

[21] Appl. No.: 241,016

[22] Filed: May 11, 1994

[30] Foreign Application Priority Data

May 21, 1993 [DE] Germany .................. 4317032

[51] Int. Cl.$^6$ ........................... H01M 10/40
[52] U.S. Cl. .......................... 429/194; 429/197
[58] Field of Search ............ 429/194, 196, 197, 218, 429/224, 198

[56] References Cited

U.S. PATENT DOCUMENTS

| | | | |
|---|---|---|---|
| 4,952,330 | 8/1990 | Leger et al. | 429/197 X |
| 5,021,308 | 6/1991 | Armand et al. | 429/194 |
| 5,272,022 | 12/1993 | Takami et al. | 429/197 |

FOREIGN PATENT DOCUMENTS

WO9202966  2/1992  WIPO .

OTHER PUBLICATIONS

"Swing" Cell, J. Power Sources, vol. 43 (1-3), 223-231 (1993) (month not available).

Primary Examiner—Anthony Skapars
Attorney, Agent, or Firm—Weiser & Associates

[57] ABSTRACT

Nontoxic, chemically stable lithium tris(fluorosulphonyl)methanide, $LiC(SO_2F)_3$, is used as a conducting salt for rechargeable lithium cells containing nonaqueous electrolytes based on esters or polymeric electrolytes such as polyethylene oxide. The cell electrolyte is preferably comprised of an approximately 1 molar solution of the salt in a mixture of 50% by volume of ethylene carbonate (EC) and 50% by volume of diethyl carbonate (DEC).

15 Claims, 1 Drawing Sheet

RECHARGEABLE GALVANIC LITHIUM CELL

BACKGROUND OF THE INVENTION

The present invention relates to rechargeable galvanic lithium cells having a negative electrode, a positive electrode and an electrolyte which is comprised of an alkali-metal salt dissolved in a mixture with a plurality of organic solvents or organic polymers.

Because of the high reactivity of the alkali metal, lithium cells contain electrolytes based exclusively on nonaqueous organic solvents. Such electrolytes generally include a conducting salt dissolved in a solvent such as propylene carbonate, ethylene carbonate, tetrahydrofuran, dimethoxyethane, $\gamma$-butyrolactone or the like, and also of mixtures of these components.

The conducting salts often used are lithium salts such as $LiAsF_6$, $LiClO_4$, $LiBF_4$, $LiSbF_6$, $LiAlCl_4$ or $LiCF_3SO_3$. Their suitability for a particular use depends upon a good dissociation capability in the particular solvent, so that a sufficient number of ionic charge carriers are present for electrolytic current conduction. The conductivity of good organic electrolytes should be at least on an order of magnitude of $10^{-3}$ S $\times cm^{-1}$.

As a further condition, the dissolved salts in the galvanic lithium cell (like the solvents) must be nontoxic substances, and must be stable, both thermally and electrochemically with respect to the aggressive lithium (for potentials ranging from 0 to 4 V, against $Li/Li^+$).

In this respect, even well established and proven conducting salts still leave something to be desired. There is a risk of detonation in the case of perchlorates. According to A. Dominey et al. (Proc. Intersoc. Energy Convers. Eng. Conf. 1990 (25), 3, 382-4), other salts containing a complexed fluoride anion are susceptible to reduction of the central ion if this has an appropriate metallic nature. This can occur, for example, in the case of $SbF_6^-$, whereas anions such as $BF_4^-$, $PF_6^-$ or $AsF_6^-$ (having a nonmetal as the central ion) are thermally unstable. Although lithium trifluoromethanesulphonate ($LiCF_3SO_3$) is stable, it does not provide optimum conductivity as a conducting salt.

As a suitable conducting salt for rechargeable lithium batteries containing polymeric electrolytes, Dominey (cited above) mentions lithium tris(trifluoromethanesulphonyl) methanide, $LiC(CF_3SO_2)_3$, which is thermally stable and which is said to exhibit a maximum conductivity (in a polymeric electrolyte) of $5 \times 10^{-4}$ $(ohm \times cm)^{-1}$ at 25° C. As a comparison, $1 \times 10^{-2}$ $(ohm \times cm)^{-1}$ at 25° C. is mentioned as the conductivity for a 1.0 molar solution of this salt in tetrahydrofuran. The free acid, $HC(CF_3SO_2)_3$, on which this trisubstituted methane compound is based was first prepared by L. Turowsky and K. Seppelt (Inorg. Chem. 27, 2135-2137 (1988)).

PCT Application WO92/02966 proposes using fluorinated "methane salts" in nonaqueous battery electrolytes. These components are theoretically derived from a more simply constructed "acid", tris(fluorosulphonyl)methane, $HC(SO_2F)_3$, by replacing the three F atoms by halogenated alkyl groups and the H atom by a monovalent metal cation ($Me^+$). This acid was first synthesized by G. Klöter, H. Pritzkow and K. Seppelt (Angew. Chem. 1980, 92, 954).

SUMMARY OF THE INVENTION

It is therefore the object of the present invention to provide a lithium cell having a nonaqueous electrolyte with a conducting salt component capable of satisfying the requirements of toxic safety, good dissociation capability of the metal atom, and chemical and thermal stability which are improved from the conducting salts previously in use.

These and other objects are achieved in accordance with the present invention by a galvanic lithium cell having a negative electrode, a positive electrode and an electrolyte comprised of a mixture of organic solvents or of organic polymers in which lithium tris(fluorosulphonyl)methanide, $LiC(SO_2F)_3$, is dissolved as a conducting salt.

For further detail regarding lithium cells produced according to the present invention, reference is made to the description which is provided below, taken in conjunction with the following illustrations.

DETAILED DESCRIPTION OF PREFERRED EMBODIMENTS

Figure 1:
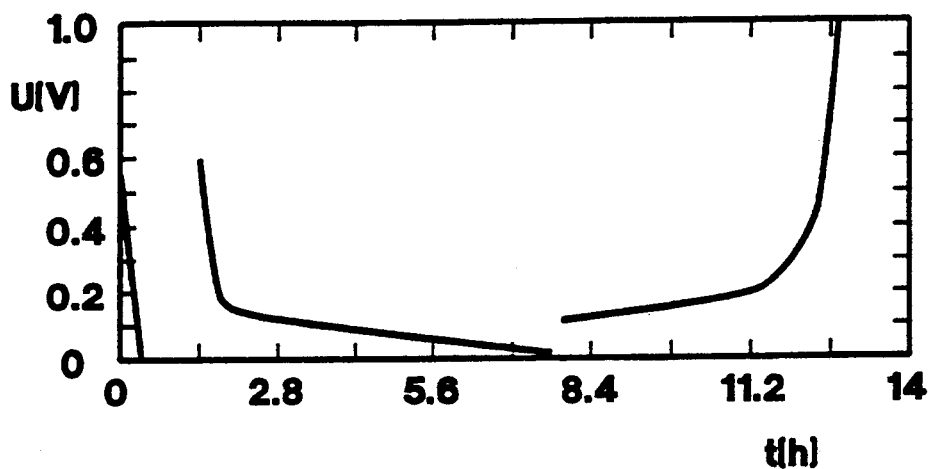
FIG. 1 is a graph showing the discharge/charge voltage of an $Li_xC_6$ electrode relative to $Li/Li^+$, in the presence of the electrolyte of this invention.

The organic solvents in the cell of the present invention have an aprotic nature and are preferably esters. Ethylene carbonate (EC) has proved to be a particularly beneficial solvent for the electrolyte salt of the present invention. However, since it is solid at room temperature, it has to be mixed with other, more readily volatile esters.

The proportion of ethylene carbonate in the solvent mixture should be between 30 and 70% by volume, and preferably about 50% by volume. The remainder, to 100% by volume, should be accounted for by at least one ester from the group including propylene carbonate (PC), diethyl carbonate (DEC) and dimethyl carbonate (DMC). All these esters are notable for a high solvating power. As a result of this property, the lithium salt of the present invention dissolves in an amount adequate to achieve a high electrical conductivity.

The applicable concentration of $LiC(SO_2F)_3$ in the solvent mixture is, according to the present invention, between 0.6 and 1.3M, and preferably approximately 1M. The novel lithium salt proves to be chemically stable to an outstanding extent under all practical operating conditions of the cell, in particular with respect to the reducing effect of the lithium electrode and the oxidizing effect of the positive electrode.

The field of application of the conducting salt of the present invention also extends to lithium cells having more highly viscous, gel-like polymeric electrolytes, for example, those based on polyethylene oxide, polyphosphazenes, polyvinyl ethers and polysiloxanes. The conducting salt can furthermore be used in so-called "polymeric cells" in which at least one of the two electrode polarities is formed from a conductive polymer such as polyaniline, polypyrrole or polyacetylene.

The lithium cells of the present invention are predominantly secondary cells for most applications. However, also included are cells which, because of their electrode material, are only suitable for primary applications.

The negative electrodes which can be used in accordance with the present invention, in addition to those comprised of pure Li metal, also include alloy electrodes formed with, for example, Al, Mg or Si as alloying components, or preferably lithium-intercalating structures with a graphite or carbon base. As so-called "host" substances, the latter structures have the ability to reversibly absorb and desorb Li ions in interlayers or in channels of their crystal lattice, in synchronism with charging and discharging.

Beneficial positive electrodes are, in particular, metal oxides such as $CoO_2$, mixed oxides of cobalt and nickel which form laminated lattices, or manganese oxides which crystallize in their spinel lattice. Like the above-mentioned carbon products, these oxides can be doped and undoped with lithium.

Manganese oxides which are isomorphous in their true spinel, $MgAl_2O_4$, and which are also referred to as oxospinels, can be represented by the general formula $AB_2O_4$, in which A and B denote a di-, tri- or tetravalent cation of one of the metals Ti, V, Cr, Mn, Fe, Co, Ni, Cu, Zn, Mg or Al and at least one of the two, A or B, is a transition metal. While the oxygen atoms form a negatively charged frame-like tetrahedral and octahedral lattice, the A cations occupy the tetrahedral gaps and the B cations occupy the octahedral gaps in the lattice. Oxospinels may occur not only in this "normal" spinel lattice, but also in an inverse structural type. In the latter case, half of the B cations occupy tetrahedral gaps, while the A cations are divided with the remaining B cations among the octahedral gaps. This distribution in the inverse spinel type is taken into account by the general formula $B(AB)O_4$.

Particularly advantageous is the combination of a lithium-intercalating carbon electrode with a lithium-intercalating mixed-oxide counter electrode having a laminated lattice, or with a manganese spinel electrode of one of the above-mentioned structural types. This results in a so-called "SWING" cell (cf., J. Power Sources, Vol. 43 (1-3) 223-231 (1993)).

The present invention is described in greater detail with reference to the following examples. Results of corresponding electrical experiments are illustrated by graphs shown in FIGS. 1 to 3.

EXAMPLE 1

2.15 g of $LiC(SO_2F)_3$ were dissolved in 8 ml of a mixture of 50:50% by volume of EC:DEC. The prepared electrolyte has a conductivity of $6.55 \cdot 10^{-3}$ $S \times cm^{-1}$ at 22° C.

The casing halves of a flat cell, each having an electrode area of 10 cm², were filled so that one half was loaded with a homogeneous mixture of 85 mg of graphite powder and 5 mg of polyacrylate binder, and so that the other half was provided with a Li foil, as a counter electrode. The two electrodes were electrically separated by a polypropylene separator. 150 µl of the above mentioned mixture served as the electrolyte (1.0 molar in relation to the $LiC(SO_2F)_3$).

During the first discharging of the cell at 1 mA/cm², and an additional discharging at 0.5 mA/cm² to 0 V against Li/Li+, 360 mAh/g of graphite were discharged. The subsequent charging at 0.5 mA/cm² to 1.0 V against Li/Li+ yielded 286 mAh/g.

FIG. 1 shows variation in the voltage U[V] of the produced half-cell during a discharge/charge cycle and over time t[h].

EXAMPLE 2

The test electrolyte was the same as in Example 1.

Of the casing halves of the flat cell (each having an electrode area of 10 cm²), one half was loaded with a homogeneous mixture of 260 mg of $LiCoO_2$ and 10 mg of binder and the other half was provided with a Li foil as a counter electrode. The two electrodes were electrically separated by a polypropylene separator. 150 µl of the above-mentioned mixture served as the electrolyte.

During the first charging of the cell at 1 mA/cm², and an additional charging at 0.5 mA/cm² to 4.2 V against Li/Li+, 104 mAh/g of $LiCoO_2$ were charged. The subsequent discharge at 0.5 mA/cm² to 3.3 V against Li/Li+ yielded 96.3 mAh/g of $LiCoO_2$.

Figure 2:
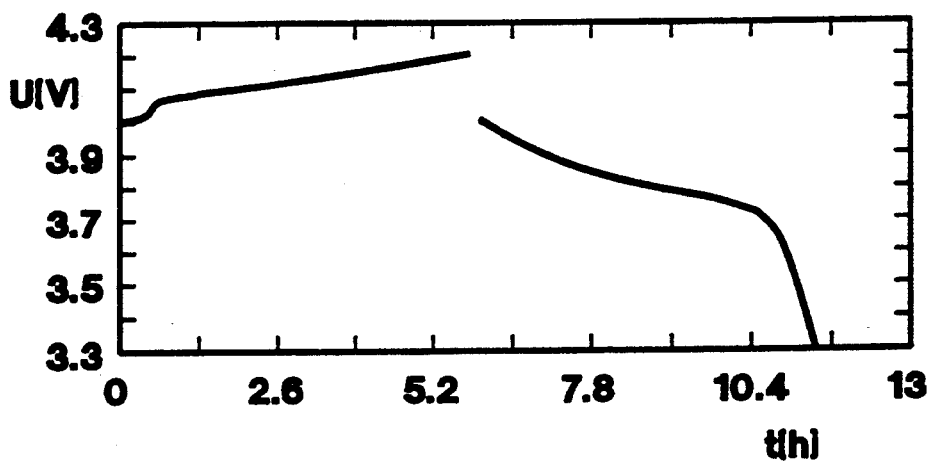
FIG. 2 is a graph showing the charge/discharge voltage of a $Li/LiCoO_2$ cell containing the electrolyte of the present invention.

FIG. 2 shows variation in the cell voltage U[V] during a charge/discharge cycle and over time t[h].

EXAMPLE 3

The test electrolyte was the same as in Example 1.

Of the casing halves of the flat cell (each having an electrode area of 10 cm²) one half was loaded with a homogeneous mixture of 305 mg $LiCoO_2$ and 15 mg of polyacrylate binder and the other half was loaded with a homogeneous mixture of 85 mg of graphite powder and 5 mg of binder. The two electrodes were electrically separated by a polypropylene separator. 150 µl of the above mentioned mixture served as the electrolyte.

During the first charging of the cell at 1 mA/cm² to 4.2 V, and an additional charging at 0.5 mA/cm² to 4.2 V, 34.4 mAh were injected, which corresponds to charge acceptances of 113 mAh/g of $LiCoO_2$ and 404 mAh/g of graphite.

The first discharging at 0.5 mA/cm² to 2.3 V yielded 27.4 mAh, which corresponds to current efficiencies of 90 mAh/g for $LiCoO_2$ and 322 mAh/g for graphite, respectively.

Figure 3:
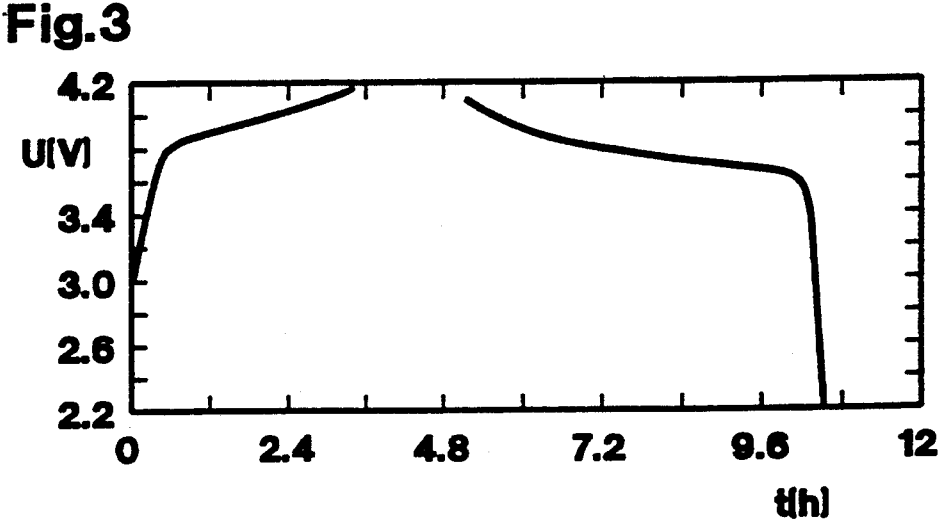
FIG. 3 is a graph showing the charge/discharge voltage of a $Li_xC/LiCoO_2$ cell containing the electrolyte of the present invention.

FIG. 3 shows variation in the cell voltage U[V] during a charge/discharge cycle and over time t[h]. In this case, the result is typical of a SWING system working at 4 volts.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A rechargeable galvanic lithium cell having a negative electrode, a positive electrode and an electrolyte comprised of a mixture of lithium tris(fluorosulphonyl)-methanide, $LiC(SO_2F)_3$, dissolved in organic solvents or in organic polymers.

2. The rechargeable galvanic lithium cell of claim 1 wherein the organic solvents are esters.

3. The rechargeable galvanic lithium cell of claim 2 wherein the solvent mixture is comprised of ethylene carbonate (EC) and at least one further ester selected from the group consisting of propylene carbonate (PC), diethyl carbonate (DEC) and dimethyl carbonate (DMC).

4. The rechargeable galvanic lithium cell of claim 3 wherein the ethylene carbonate is present in the solvent mixture in an amount of from 30 to 70% by volume.

5. The rechargeable galvanic lithium cell of claim 4 wherein the amount of ethylene carbonate in the solvent mixture is approximately 50% by volume.

6. The rechargeable galvanic lithium cell of claim 3 wherein the $LiC(SO_2F)_3$ has a concentration in the solvent mixture of from 0.6 to 1.3 molar.

7. The rechargeable galvanic lithium cell of claim 6 wherein the concentration is about 1 molar.

8. The rechargeable galvanic lithium cell of claim 1 wherein the negative electrode is a lithium electrode.

9. The rechargeable galvanic lithium cell of claim 1 wherein the negative electrode is a lithium alloy electrode.

10. The rechargeable galvanic lithium cell of claim 1 wherein the negative electrode is a lithium-intercalating carbon electrode.

11. The rechargeable galvanic lithium cell of claim 1 wherein the positive electrode is a metal oxide electrode selected from the group of metal oxides consisting of $CoO_2$, mixed oxides of cobalt and nickel, and manganese oxides.

12. The rechargeable galvanic lithium cell of claim 11 wherein the positive electrode is a lithium-intercalating metal-oxide electrode.

13. The rechargeable galvanic lithium cell of claim 11 wherein the positive electrode is a lithium-intercalating manganese spinel electrode.

14. The rechargeable galvanic lithium cell of claim 1 wherein the positive electrode is comprised of a conductive polymer.

15. The rechargeable galvanic lithium cell of claim 1 wherein the negative electrode is comprised of a conductive polymer.

* * * * *